Figure 1:
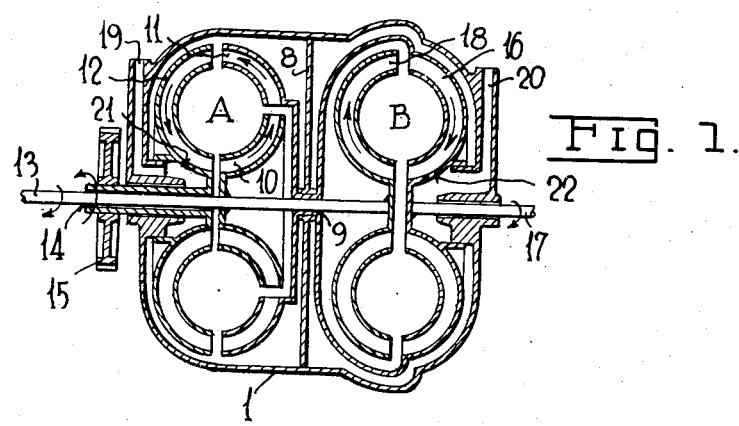

Jan. 24, 1939.  R. FICHTNER  2,145,006
TURBO GEARING
Filed Feb. 14, 1936  2 Sheets-Sheet 1

Inventor
Rudolf Fichtner,
By Harry E. Dunham
Attorney

Jan. 24, 1939.   R. FICHTNER   2,145,006
TURBO GEARING
Filed Feb. 14, 1936   2 Sheets-Sheet 2

Inventor
Rudolf Fichtner,
By Harry E. Dunham
Attorney

Patented Jan. 24, 1939

2,145,006

UNITED STATES PATENT OFFICE 2,145,006

TURBO GEARING

Rudolf Fichtner, Berlin, Germany, assignor to General Electric Company, a corporation of New York Application February 14, 1936, Serial No. 63,975
In Germany February 16, 1935

10 Claims. (Cl. 60—54)

This invention relates to a hydraulic transmission comprising two turbo gear units, at least one of which is a turbo torque converter provided with a pump wheel and two rotatably mounted turbo wheels, the blades of which are so arranged that the turbo wheels may rotate in opposite directions without the use of any stationary guide wheel. Such turbo torque converter with two oppositely rotating turbo wheels is the subject matter of my copending application S. N. 63,974, filed February 14, 1936. As more fully described therein the second turbo wheel which is used instead of the stationary guide wheel of the usual torque converter makes it possible to utilize the torque which would otherwise be taken up by the frame of the apparatus. The total output torque is equal to the sum of the torques of the two oppositely rotating turbo wheels and has its maximum value during very low speeds, thus giving the possibility of starting with greater torque than that of the usual torque converter in which only the output torque of one turbo wheel is available and in which the torque of the stationary guide wheel is taken up by the frame of the machine. With increasing speed the torque of the two oppositely rotating turbo wheels will fall off rather quickly. In order to have a sufficient torque within a wider speed range the second turbo wheel may be locked, thus giving the advantage of the usual torque converter with a stationary guide wheel, that is, higher torque at higher speeds.

The present invention relates to other and further means for extending the useful speed range of turbo gears with increased starting torque by providing a second turbo unit which may be either a turbo coupling or a second torque converter. Such a hydraulic transmission is particularly suited for driving vehicles having a plurality of axles. It is desired, in connection with this manner of driving vehicles, that the individual driven axles be mechanically independent of each other. This mechanical independency is rendered possible by the present invention in a practically ideal way, in that the gearing can give off torque to two or three secondary shafts acting upon one another solely hydrodynamically and each shaft may be connected with a separate vehicle axle.

As a rule, the differential converter of the gearing serves for producing the high starting torque, and one of its secondary shafts may be disconnected and locked against rotation for running at medium speeds. The second part which may be a turbo coupling or a second torque converter is used for high speeds. As a rule, only one hydraulic circuit is filled, but when starting, both circuits may be filled at the same time. A decrease in the number of revolutions resulting therefrom, as well as of the performance, can be compensated by choosing a different gear ratio between the turbo-gearing and the axles. Also the fluid circuit used in starting can be made extra large so as to be suited for handling a larger output so that the decrease of output of the motor remains within narrow limits.

If the differential converter is so designed that one of the turbine members can be uncoupled from the appertaining axle and locked against rotation, the gearing with its two hydraulic circuits has the capabilities of a gearing of known design with three fluid circuits. The operation of the differential converter with two turbine members rotating counter to one another corresponds then to the first stage of operation whereby a high torque is obtained at low speeds; the operation with a locked wheel corresponds to the second stage of operation whereby a medium torque is obtained at medium speeds; and the operation with the other circuit corresponds to the third stage of a gearing with three circuits whereby high speeds may be obtained with low torques. If a second differential transformer is likewise employed in two steps, there are then obtained in all, four stages of operation.

The uncoupling and locking of the turbine members can be effected either from the place of the attendant or automatically in a known manner by reversing the direction of the turning moment. The second converter can also be used as a single converter or as a differential converter for running the vehicle rearwardly without making use of a reversing gearing for this purpose.

Figure 2:
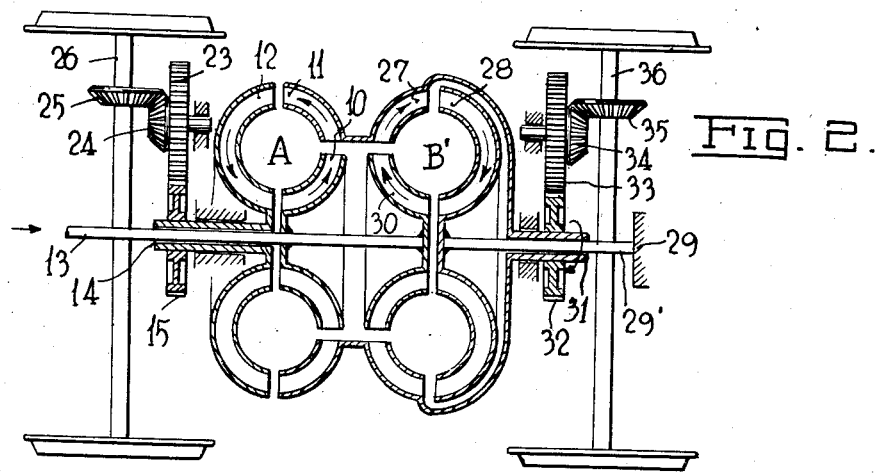
Figure 3:
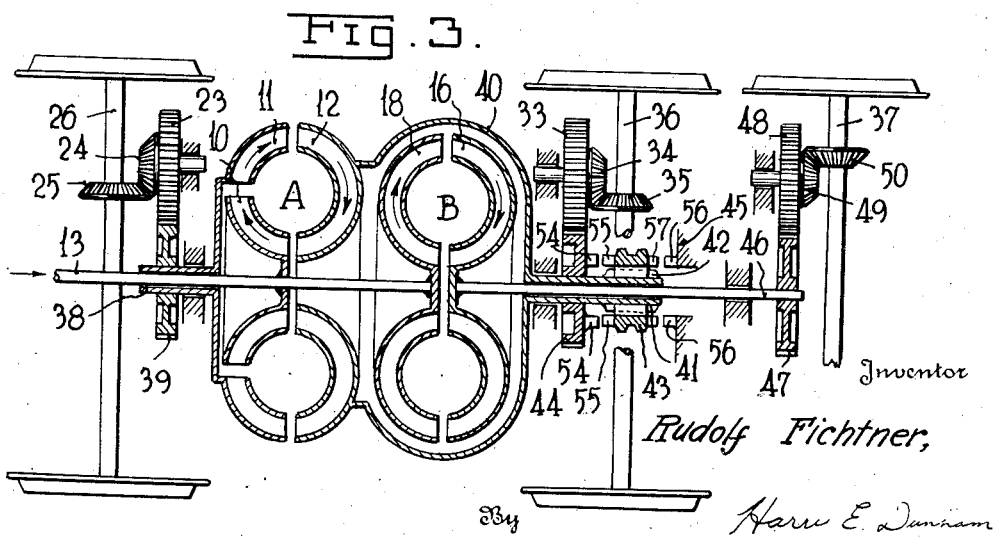
Figure 4:
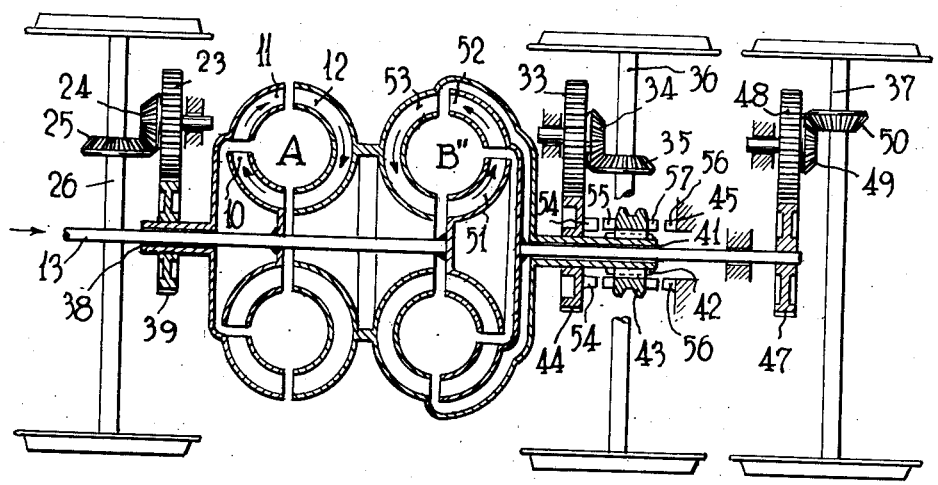
Figure 5:
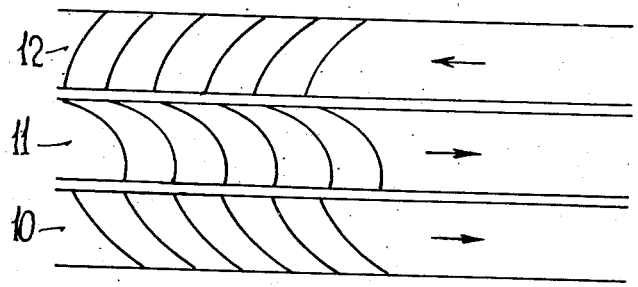

My invention will be better understood from reference to the accompanying drawings wherein Figure 1 represents a diagrammatical axial cross section of a differential torque converter combined with a hydraulic coupling of the usual construction. Figure 2 is a diagrammatic illustration partly in cross section of a differential torque converter combined with a torque converter of the usual construction having a stationary guide wheel and arranged to drive a railroad truck. Figure 3 is a diagrammatic illustration partly in cross-section of a differential torque converter and a hydraulic coupling of the usual construction showing how power may be applied to three driven shafts. Figure 4 is a diagrammatic illustration partly in cross-section of two differential torque converters combined to deliver power to three separate driven shafts. Figure 5 shows diagrammatically the blade arrangement of the differential torque converter.

In Figure 1, A denotes the differential torque converter while B denotes a turbo coupling. The differential converter A has a pump wheel 10 mounted upon and driven by shaft 13. Hydraulically coupled to pump wheel 10 are two turbo wheels 11 and 12 mounted to rotate coaxially with pump wheel 10. The blading of turbo wheels 11 and 12 is such that turbo wheel 11 rotates in the same direction as pump wheel 10, while turbo wheel 12 rotates in the opposite direction. Turbo wheel 12 is mounted on a sleeve 14 surrounding drive shaft 13. This sleeve 14 carries a gear 15 which may be used to drive any desired apparatus not shown in Figure 1. The turbo wheel 11 is mounted upon a sleeve 9 surrounding shaft 13. The turbo coupling B has a pump wheel 18 which is also mounted upon and driven by shaft 13. The turbo wheel 16 is mounted coaxially with pump wheel 18 and connected to a shaft 17. Turbo wheel 16 is also connected with turbo wheel 11 through sleeve 9 so that these two wheels rotate together at all times. The differential converter A and the turbo coupling B are both mounted in a housing 1 adapted to hold the fluid used in the circuits of converter A and coupling B. Diaphragm 8 serves to divide the housing into two parts so that fluid may be supplied to A or B as desired. The fluid can be introduced into the housing 1 through channels 19 and 20 from whence it may enter the hydraulic circuits of A and B, respectively, through openings 21 and 22. It would also be possible to introduce the fluid by means of bores in the shafts or by various other means but since my invention does not pertain to the auxiliary apparatus usually used with hydraulic couplings for introducing or withdrawing fluid and the accompanying control means, this apparatus has not been illustrated for the sake of clarity.

During operation, one of the circuits A or B is filled with fluid while the other is empty. For acceleration and starting where a high torque is desired, the differential converter A is filled with fluid. When running at full speed and under normal conditions, the turbo coupling B is filled with fluid. The operation of the arrangement of Figure 1 under these different conditions is as follows. Fluid is first admitted to the fluid circuit of the differential converter A through channel 19. Shaft 13 then drives the pump wheel 10, and the fluid in circuit A causes the turbo wheel 11 to rotate in the same direction while the turbo wheel 12 rotates in the opposite direction. The torque developed by turbo wheel 12 is transmitted through sleeve 14 to the gear 15, while the torque developed by turbo wheel 11 is transmitted through sleeve 9 and turbo wheel 16 to shaft 17. Under these conditions, the pump wheel 18 of coupling B rotates idly since it is driven by shaft 13. It does not do any work nor have any effect on turbo wheel 16 since there is at this time no fluid in circuit B. As soon as the driven apparatus has come up to some predetermined speed, fluid is admitted to coupling B through channel 20 and withdrawn from converter A through channel 19. Under these conditions, pump wheel 18, which is driven by shaft 13, becomes hydraulically coupled with turbo wheel 16. A transmission of energy then takes place from shaft 13 through pump wheel 18 to turbo wheel 16 and from there to the shaft 17. The rotation of shaft 13 also drives pump wheel 10 and the rotation of pump wheel 10 serves to drive turbo wheel 11. The rotation of pump wheel 10 and turbo wheel 11 has no effect, however, since there is no fluid present in circuit A.

In the arrangement of Figure 2, the differential torque converter A is the same as that shown and described in Figure 1. The torque converter B' includes a pump wheel 30 direct connected to driven shaft 13. The turbo wheel 27 corresponds to the turbo wheel 16 of Figure 1 and is carried by a sleeve 31 surrounding shaft 29'. Turbo wheel 27 is connected to turbo wheel 11 so as to rotate therewith. Stationary guide wheel 28 is mounted on shaft 29' which is secured against rotation by being attached to abutment 29. Sleeve 31, which is driven by turbo wheel 27, carries a gear 32 which is adapted to drive a vehicle axle 36 through the intermediate gears 33, 34 and 35. Gear 15, driven by turbo wheel 12 of the differential converter A, is arranged to drive a second vehicle axle 26 through intermediate gears 23, 24 and 25. The operation of the apparatus shown in Figure 2 is similar to that shown in Figure 1 in that the fluid circuit of converter A may first be filled to give a high starting or accelerating torque, and the fluid circuit of B' may subsequently be filled to give a smaller torque during operation at full speed. When fluid is introduced into the circuit A, the pump wheel 10 driven by shaft 13 is hydraulically coupled to turbo wheels 11 and 12 and drives turbo wheel 11 in the same direction and turbo wheel 12 in the opposite direction. Torque is transmitted from turbo wheel 11 through turbo wheel 27 which is direct connected thereto, and sleeve 31 to gear 32. The torque from turbo wheel 12 is transmitted through sleeve 14 to gear 15. Gears 32 and 15 drive axles 36 and 26 respectively. Under these conditions, the differential converter A drives both axles, giving a high starting and accelerating torque. The fact that torque is applied simultaneously to both axles is also of advantage in that power is applied to all four wheels, thus permitting a greater tractive effort. When the vehicle comes up to normal speed, the fluid is withdrawn from circuit A and introduced into circuit B'. Under these conditions, shaft 13 drives pump wheel 30 which, in turn, drives turbo wheel 27. The torque from turbo wheel 27 is applied to axle 36 through sleeve 31 and the intermediate gearing. Converter A is, under these conditions, idle and consequently no torque is transmitted to axle 26.

In the arrangement of Figure 3, an illustration is given of the application of an arrangement, similar to that shown in Figure 1, to a vehicle having three driven axles. In this arrangement, pump wheel 10 is driven by shaft 13 and, in turn, drives turbo wheels 11 and 12. Turbo wheel 11 is connected to sleeve 38 which carries gear 39 and, in turn, drives axle 26 through intermediate gears 23, 24 and 25. Turbo wheel 12 is connected to sleeve 41 by extension 40 extending around the outside of coupling B. Coupling sleeve 43 is splined on sleeve 41, so as to be slidable axially of the sleeve. Mounted to rotate on sleeve 41 is also a gear 44. Gear 44 is arranged to drive axle 36 through the intermediate gears 33, 34 and 35. Gear 44 carries dogs 54 arranged to cooperate with similar dogs 55 on coupling sleeve 43. On the opposite side of coupling sleeve 43, is an abutment 45 carrying dogs 56 arranged to cooperate with dogs 57 on coupling sleeve 43. It will thus be seen that coupling sleeve 43 may be moved to the left or right along sleeve 41, so as to engage gear 44 and thus drive axle 36 or to engage dogs 56 on abutment 45, thus locking the coupling sleeve and consequently sleeve 41 against rotation. Coupling sleeve 43 may also be left in an intermediate position, wherein it is neither connected to gear 44 nor the abutment 45. Coupling B includes a pump wheel 18 and a turbo wheel 16. Turbo wheel 16 is carried by and drives shaft 46 which, in turn, drives gear 47. Gear 47 is arranged to drive axle 37 through intermediate gears 48, 49 and 50. In the operation of the arrangement of Figure 3, it is possible to obtain three different coupling ratios between the driving shaft 13 and the vehicle axles 26, 36 and 37.

*First.*—For starting, the differential converter A is filled with fluid and the turbo coupling B is left empty. Under these conditions and with coupling sleeve 43 moved to the left, turbo wheel 11 operates to drive axle 26 and turbo wheel 12 drives axle 36. This gives a high torque and transmits power to two axles, i. e., four wheels.

*Second.*—When the vehicle has reached a predetermined medium speed, the coupling sleeve 43 is moved to the right to engage abutment 45, whereupon turbo wheel 12 is disengaged from axle 36 and locked against rotation. The differential converter A then operates as a normal turbo converter with a stationary guide wheel, i. e. the turbo wheel 12 becomes the stationary guide wheel. Under these conditions, axle 26 is driven by turbo wheel 11.

*Third.*—When the vehicle has reached a predetermined high speed, the fluid is withdrawn from the differential converter A and turbo coupling B is filled. Under these conditions, pump wheel 18 is hydraulically coupled to turbo wheel 16, which drives axle 37.

In the arrangement of Figure 4, two differential torque converters are combined to drive a vehicle having three axles. This arrangement differs from that of Figure 3 in that the second turbo gearing B" which is substituted for the hydraulic coupling is a second differential torque converter similar to converter A. This converter B" comprises a pump wheel 51, a turbo wheel 52 rotating in the same direction and a turbo wheel 53 running in the opposite direction. Converter A is arranged the same as the converter A shown and previously described in connection with Figure 3. In this case, counter-running turbo wheel 12 of converter A is connected to counter-running turbo wheel 53 of the second differential converter B". Turbo wheel 53 is, in turn, connected to sleeve 41 which is arranged to be connected to axle 36 or locked against rotation the same as sleeve 41 of Figure 3. Pump wheel 52 of the second differential converter B" is connected to shaft 46 which is geared to axle 37, the same as in Figure 3.

The mode of operation of the arrangement shown in Figure 4 is similar to that of Figure 3. In starting where a high torque is desired, the differential converter A is filled with fluid and the converter B" is left empty. The coupling sleeve 43 is moved to the left, thereby connecting turbo wheel 12 through gear 44 to axle 36. The differential converter A thus operates to drive axle 26 through turbo wheel 11 and axle 36 through turbo wheel 12. When the vehicle has reached a predetermined speed, the coupling sleeve 43 may be moved to the right, whereby turbo wheel 12 is disconnected from axle 36 and is locked against rotation. Under these conditions, converter A operates as a normal turbo converter having a stationary guide wheel. The converter A thus drives only axle 26 through turbo wheel 11. When high speed is reached, the fluid is removed from converter A and converter B" is filled instead. Depending upon the position of the coupling sleeve 43, converter B" may then either drive the two axles 36 and 37, or axle 37 alone. If it is desired to drive both axles 36 and 37, the coupling sleeve 43 is moved to the left, thereby connecting turbo wheel 53 to axle 36. In driving axle 37 alone, coupling sleeve 43 is moved to the right, thus locking turbo wheel 53 against rotation.

It is also possible to fill both converters A and B" and lock both the counter-running turbo wheel 12 and the counter-running turbo wheel 53 against rotation. In this case, both of the turbo gears would operate, converter A driving axle 26 through turbo wheel 11 and converter B" driving axle 37 through turbo wheel 52. It may be seen that it is possible to obtain various combinations by filling or emptying one or the other of the turbo gears A and B", thus obtaining various driving possibilities.

I claim:

1. A hydraulic transmission comprising two turbo-gear units, one of which has a rotary pump wheel and two turbo wheels coaxially arranged with respect to each other and with respect to the pump wheel, the blades of said turbo wheels being so arranged that the said turbo wheels rotate in opposite directions with respect to each other, the other of said units comprising a pump wheel and a turbo wheel, and a driving connection between one of the turbo wheels of said first unit and the said turbo wheel of the second unit.

2. A hydraulic transmission comprising two turbo-gear units, one of which has a rotary pump wheel and two turbo wheels coaxially arranged with respect to each other and with respect to the pump wheel, the blades of said turbo wheels being so arranged that the said turbo wheels rotate in opposite directions with respect to each other, the other of said units being a hydraulic coupling consisting of a pump wheel and a turbo wheel, and a driving connection between one of the turbo wheels of said first unit and the turbo wheel of said hydraulic coupling.

3. A hydraulic transmission comprising two turbo-gear units, one of which has a rotary pump wheel and two turbo wheels coaxially arranged with respect to each other and with respect to the pump wheel, the blades of said turbo wheels being so arranged that the said turbo wheels rotate in opposite directions with respect to each other, the other of said units being a hydraulic torque converter consisting of a pump wheel, a stationary guide wheel and a turbo wheel, and a driving connection between one of the turbo wheels of said first unit and the turbo wheel of said hydraulic torque converter.

4. A hydraulic transmission comprising two turbo-gear units, each comprising a rotary pump wheel and two turbo wheels, the pump wheel and the turbo wheels being coaxially arranged in each unit, the blades of said turbo wheels being so arranged that one turbo wheel of each unit rotates in one direction while the other turbo wheel in the same unit rotates in the opposite direction and a driving connection between one of the turbo wheels of one unit and one of the turbo wheels of the other unit.

5. A hydraulic transmission for driving vehicles comprising two turbo-gear units, one of which has a rotary pump wheel and two turbo wheels coaxially arranged with respect to each other and with respect to the pump wheel, the blades of said turbo wheels being so arranged that the said turbo wheels rotate in opposite directions with respect to each other, the other of said units comprising a pump wheel and a turbo wheel, a driving connection between one of the turbo wheels of said first unit, the said turbo wheel of the second unit and one axle of the vehicle and another driving connection between the other turbo wheel of the first unit and another axle of the vehicle.

6. A hydraulic transmission for vehicles comprising two turbo-gear units, each comprising a rotary pump wheel and two turbo wheels, the pump wheel and the turbo wheels being coaxially arranged in each unit, the blades of said turbo wheels being so arranged that one turbo wheel of each unit rotates in one direction while the other turbo wheel in the same unit rotates in the opposite direction, a driving connection between one of the turbo wheels of one unit, one of the turbo wheels of the other unit, and one axle of a vehicle and additional driving connections respectively between each of the other turbo wheels of each unit and one of two other independent axles of said vehicle.

7. A hydraulic transmission for vehicles comprising two turbo-gear units, each comprising a rotary pump wheel and two turbo wheels, the pump wheel and the turbo wheels being coaxially arranged in each unit, the blades of said turbo wheels being so arranged that one turbo wheel of each unit rotates in one direction while the other turbo wheel in the same unit rotates in the opposite direction, a driving connection between one of the turbo wheels of one unit, one of the turbo wheels of the other unit, and one axle of a vehicle, additional driving connections respectively between each of the other turbo wheels of each unit and one of two other independent axles of said vehicle and means for disconnecting at least one of the turbo wheels from its corresponding driven axle and locking the former against rotation.

8. A hydraulic transmission for driving vehicles comprising two turbo-gear units, one of which has a rotary pump wheel and two turbo wheels coaxially arranged with respect to each other and with respect to the pump wheel, the blades of said turbo wheels being so arranged that the said turbo wheels rotate in opposite directions with respect to each other, a driving connection between one of said turbo wheels of said first unit and one axle of the vehicle and another driving connection between the other turbo wheel of the first unit and another axle of said vehicle, the other of said turbo units comprising a pump wheel and a turbo wheel, and means for utilizing the torque of the turbo wheel of said second unit for driving one of the axles of said vehicle.

9. A hydraulic transmission for driving vehicles with at least three axles comprising two turbo-gear units, one of which has a rotary pump wheel and two turbo wheels coaxially arranged with respect to each other and with respect to the pump wheel, the blades of said turbo wheels being so arranged that the said turbo wheels rotate in opposite directions with respect to each other, the other of said units comprising a pump wheel and a turbo wheel, a driving connection between one of the turbo wheels of said first unit and one axle of the vehicle, another driving connection between the other turbo wheel of the first unit and another axle of the vehicle and a third driving connection between the said turbo wheel of said second unit and a third axle of the vehicle.

10. A hydraulic transmission for driving vehicles with at least three axles comprising two turbo-gear units, one of which has a rotary pump wheel and two turbo wheels, coaxially arranged with respect to each other and with respect to the pump wheel, the blades of said turbo wheels being so arranged that the said turbo wheels rotate in opposite directions with respect to each other, the other of said units comprising a pump wheel and a turbo wheel, a driving connection between one of the turbo wheels of said first unit and one axle of the vehicle, another driving connection between the other turbo wheel of the first unit and another axle of the vehicle and a third driving connection between the said turbo wheel of the said second unit and a third axle of the vehicle and means for disconnecting one of the turbo wheels of the first unit from its axle and locking the former against rotation.

RUDOLF FICHTNER.